April 7, 1964     A. P. GRASSER     3,128,330

VIBRATION DAMPING METHOD AND DEVICE

Filed May 5, 1960

*INVENTOR.*
ARTHUR P. GRASSER

BY *Isler & Ornstein*

ATTORNEYS

United States Patent Office 3,128,330
Patented Apr. 7, 1964

3,128,330
VIBRATION DAMPING METHOD AND DEVICE
Arthur P. Grasser, Cleveland, Ohio, assignor to Ball Damping Devices, Inc., Cleveland, Ohio, a corporation of Ohio
Filed May 5, 1960, Ser. No. 27,202
13 Claims. (Cl. 174—42)

The present invention relates to the suppression or interruption of undesirable and injurious mechanical or physical vibration patterns such as occur in certain structural or functional members due to environmental or atmospheric conditions. Such vibrations occur most commonly in flexible members such as bridge suspension cables, guy wires or rods and overhead electrical power transmission line of wire or cable. However, such vibrations may also create problems in so-called "rigid" members or structures which, nonetheless, are similarly employed as tension or compression carrying members and are so mounted or supported as to permit a degree of resiliency which will be translated into a vibration pattern. Examples of such rigid members are lighting poles, flag staffs, marine masts, long line shafts and like structures having relatively long length or span in relation to the point or points of suspension or support. Such structures or members, whether they be flexible in character, such as wire or cable, or ostensibly rigid in character, such as flag staffs, are herein designated generically as vibratory members, if they are of such shape and dimension in relation to their systems of support or securement as to be susceptible to undesired vibration induced by environmental condition of use or location.

It is the primary object of my invention to provide a method for suppressing such vibrations in spans between supports of vibratory members by establishing therein one or more zones having a frequency of vibration different in magnitude and character than the natural frequency of vibration of the vibratory member itself.

A further object of my invention is to create a suppression condition in which the zone establishes two distinct mechanical and structural vibration-responsive systems of different moduli of elasticity and stress-strain curve characteristics which, thereby, have conflicting oscillation characteristics.

Another object of my invention is to provide an apparatus or device for creating the aforesaid zones of vibration suppression.

A further object of my invention is to provide an apparatus of the character described which is integrated with the span of the vibratory member between the support or connection points.

Still another object of my invention is to provide a device of the aforesaid character which is simple in construction and economical to manufacture and install.

A still further object of my invention is to provide a device of the character described which is capable of adjustment for adaptation to varying vibration conditions.

Other objects and advantages of my invention will be apparent during the course of the following description.

In the accompanying drawings forming a part of this specification and in which like numerals are employed to designate like parts throughout the same, FIG. 1 is an elevational view of one form of my invention as mounted on a vibratory member.

Referring more particularly to the drawings, I have shown the vibratory member as being in the form of a suspended electrical power transmission cable or high tension wire 10. For briefness and clarity, my description of the invention is applied to this form of vibratory member. However, as the description proceeds, it will be apparent that the principles of my invention can be applied to other forms of vibratory members, examples of which have been noted above.

Overhead power transmission wires, suspended by insulators from variably spaced support towers, represent a common example of a vibratory member in which wave-propogated physical movement is not desired but, nevertheless, occurs. Vibrations in such power wires may be induced by atmospheric wind, by electromagnetic induction influences, by earth waves or pulsations transmitted through the support media, by sound waves or perhaps by other vibration-inducing sources. A span of power wire suspended between two towers will have a certain natural frequency of vibration which is dependent upon various factors including, the length of the span, the inherent flexibility of the wire or cable and the tension in the wire or cable. The natural frequency wave-pattern of the vibration is modified by harmonics, by terminal reflections and by similar interfering or superimposing wave patterns which may impose varying frequencies and amplitudes of vibration waves upon the power wire. Under certain conditions, vibration waves of unusually large amplitude and low frequency may be generated which create a phenomenon, commonly referred to as "galloping conductors," which are severe enough to rupture the wires. In any event, the vibrations in such power wires commonly create stress points at the terminal points of the wire span and fatigue the metal over a period of time, which necessitates frequent inspection, maintenance and eventual replacement of portions of the power wires. The alleviation of this condition is accomplished by my invention.

Figure 1:
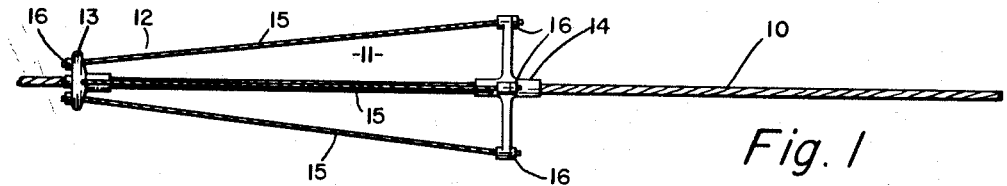

In FIG. 1 of the drawings I have shown a form of vibration trap 12 mounted on the vibratory member 10 to establish a longitudinally-extending trap zone 11 as an integrated part of a complete span of the member 10. The suppressor or trap 12 includes a pair of spaced connectors or anchor elements 13 and 14 which are firmly secured to the vibratory member 10 longitudinally thereof. One or more stress transfer elements, here shown as flexible and highly resilient metal wire or cable 15, have their free ends clamped or otherwise adjustably secured to the connectors 13 and 14, as indicated at 16. I have shown four of such elements 15. More or less may be utilized, but, ordinarily, at least two of such elements should be utilized.

For the basic function of stress transfer, the transfer elements could be disposed parallel to the vibratory member 10. However, I find it to be preferable and desirable that the elements 15 be disposed at an acute angle to the axis of the member 10 so as to provide a vector or component of force which is normal to the axis of the vibratory member. The angle closen may be influenced by various factors or conditions but, ordinarily will be in the range of 5 to 45 degrees. To this end, I have shown the connection points 16 on the anchor element 14 to be radially outwardly of the connection points 16 on the anchor element 13 so that the transfer elements 15 subtend an angle of approximately 20 degrees to the axis of the vibratory member 10.

The transfer elements have the function of modifying the stress in the vibratory member within the trap zone 11.

If the transfer elements are rigid bars or the like they can be placed under compression to accomplish an increase in the existing stress in the member 10 within the trap zone. However, ordinarily it is preferable and more expedient to use the transfer elements to relieve the stress in the zone 11 and that is the reason that the transfer elements 15, as herein described, need not necessarily be of a rigid character but may be flexible wire, rod or cable, although it will be understood that a rigid metal rod could be used, if desired, for the same stress-relieving function.

The transfer elements 15 are tensioned to a degree sufficient to create a substantially tight or rigid trap structure. The tension imposed on the elements 15 is necessarily limited by the ultimate strength of the elements 15 themselves, and ordinarily it is expedient not to tension the element 15 beyond 25-35% of its ultimate strength and approximately 5-25% of the tension present in member 10. The tensioning of the elements 15 will, depending upon the number of elements used and the tension on vibratory member 10, cause substantially all or only a portion of the tension on member 10 within the trap zone 11 to be transferred to the elements 15. This, creates a slack or partially slack or reduced tension condition in the member 10 in the zone 11 between the connectors 13 and 14 and thus establishes a zone which will not respond to and does not have the same natural vibration frequency as would otherwise exist in the member 10. The zone 11 therefore, will not maintain or sustain the vibration wave patterns which may be generated and propagated in the member 10 and thus, the zone will interrupt and interfere with the continuity of such vibration wave patterns and successfully damp and suppress them to prevent their continued propagation in the member 10.

Furthermore, as above mentioned, two or more transfer elements 15 also impress a radial component of force upon the member 10 near the end of the zone 11, as defined by the location of the connector 14, which force is exerted by the elements in opposition to each other. This establishes a condition of physical stability upon a section of the member 10 within zone 11 in which it is restrained by the opposing forces from undulatory movement or radial displacement. This physical restraint of the member 10 is a significant factor in the damping or suppression of the vibration waves. Its significance is perhaps more readily apparent in the preferred embodiment of the invention shown in FIGS. 2 and 3 of the drawing, to which reference now will be made.

Figure 2:
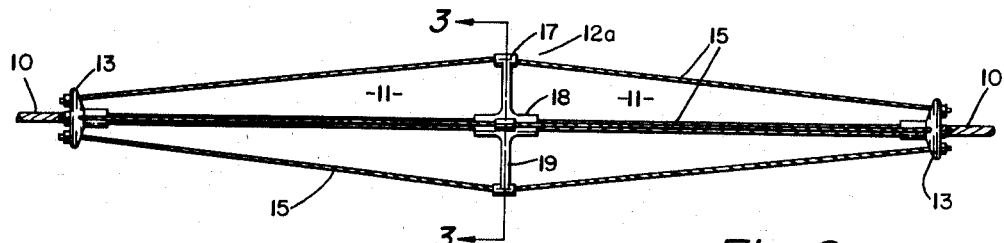
FIG. 2 is a view in elevation of a modified form of my invention as mounted on a vibratory member, in which the device is expanded to increase the influence of the zone characteristics.
Figure 3:
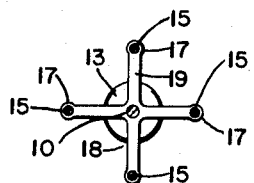
FIG. 3 is a cross-sectional view taken as indicated on line 3—3 of FIG. 2.

In FIG. 2, I have shown a vibration trap 12a in which the transfer elements 15 are connected at their opposite ends to the spaced anchor elements or connectors 13 which are firmly affixed to the member 10. The angular posture of the elements 15 is achieved by training the elements through guide means 17 which are provided on a spider or bridge element 18 which may be of substantially the same form as the anchor element 14 previously described in connection with the embodiment shown in FIG. 1. The guide means 17 may be an opening or channel, provided on each of the arms 19 of the element 18, which will freely accommodate the transfer element 15. The guide means 17 is radially outward of the connection points 16 of the ends of the elements 15 and is positioned approximately midway between the connectors 13 which define the trap zone 11. The element 18 may be fixed to the member 10 or may be slidably mounted thereon. The elements 15 may also be fixed to the spider 18. By thus fixedly securing the elements 15 and the spider 18 to the member 10, the possibility of wear by abrasion is reduced. The principle of operation of the trap 12a is the same as that described with reference to FIG. 1. The transfer elements 15 are tensioned to relieve all or part of the stress in that portion of the member 10 which lies in the zone 11, and thus prevent the zone from sustaining the vibrations induced and propagated in the member 10. The radial components of force exerted upon the member 10 through the spider 18 tend to retain that section of the member against radial displacement, as such displacement unbalances the equilibrium of forces established by the transfer elements 15 on the element 18. Thus by stiffening a portion of the member 10 through mechanical restraint as well as by establishing a zone which will not sustain the natural frequency of vibration of the member 10 nor serve to reflect such vibrations, the vibration trap suppresses the damaging vibrations in the member 10.

Figure 4:
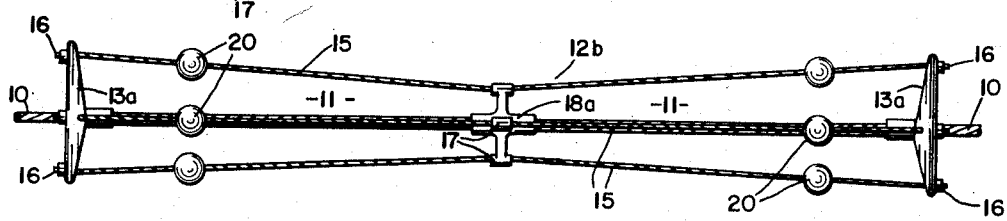
FIG. 4 is a view in elevation showing still another form of my invention.

In FIG. 4 I have shown another form of my invention in which the vibration trap 12b is so arranged that the angular posture of the transfer elements 15 is opposite to that shown in FIG. 2. The end connections 16 on the anchor elements 13a are radially outward of the guide means 17 on the centrally located spider 18a. The radial forces on the spider 18a, created by the tension on the transfer elements 15, are thus directed outwardly from the axis of member 10 in contrast to being directed inwardly in the embodiment of FIG. 2. This is the same radial force condition which would be created if rigid transfer elements under compression were utilized in the angular posture of FIG. 2. However, irrespective of whether the radial forces in equilibrium are directed inwardly or outwardly the same condition of mechanical restraint on undulation of the member 10 is achieved.

In FIG. 4 I have also shown inertial masses or weights 20 affixed to each of the transfer elements. The use of such weights is not mandatory, but under certain conditions it may be desirable to utilize them for damping high frequency wave patterns in the transfer elements 15 which might cause undue wear or abrasion of the flexible wire or cable. Such weights are reasonably effective at high frequencies but would have no significant effect on the low frequency-long wave vibrations which are most prevalent and most damaging for the member 10. Such weights 20 could be used on the transfer elements in any of the forms of my invention which I have herein disclosed, although I have illustrated their use only in the form of my invention shown in FIG. 4.

The transfer elements 15 which I have described should preferably be circumferentially spaced equidistantly. Thus, if a pair of transfer elements are used, they should be spaced 180 degrees circumferentially; if three transfer elements are used they should be spaced 120 degrees circumferentially; if four are used, they should be spaced 90 degrees apart, as shown in the drawings; etc.

The number of transfer elements which should be used will depend upon the vibration conditions which are encountered and which are to be overcome. To some extent this is a matter of choice. If the wave-pattern of the vibrations in the member 10 is uniformly in one axial plane, e.g., the vertical plane, then a pair of diametrically opposed transfer elements disposed in that plane would suffice to create an adequate uni-directional vibration trap. If, on the other hand, the vibration wave pattern does not ordinarily confine itself to any one axial plane, then three or more transfer elements should be utilized so that omni-directional vibration suppression can be accomplished. Where the vibration problem is acute, possibly eight or ten transfer elements might be needed; where the problem is only occasional three such elements may suffice. Inasmuch as icing conditions on power transmission lines also create problems in certain sections of the country, it is well to keep the number of transfer elements down to as small a number as is reasonably necessary, as too great a number of such elements will unnecessarily aggravate ice formation on the vibration trap.

Figure 5:
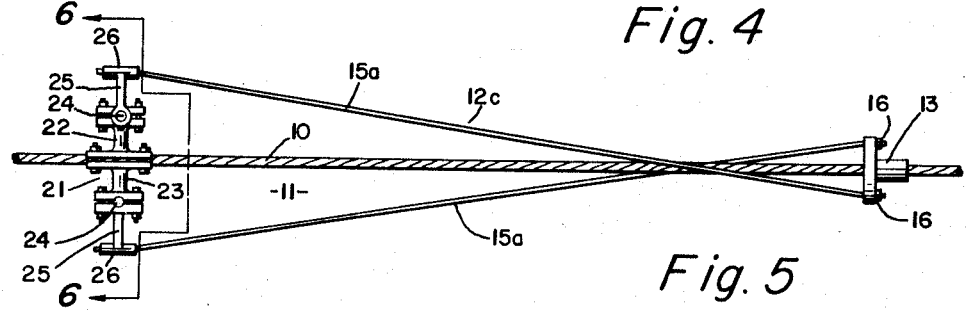
FIG. 5 is a view in elevation showing another modification of the invention.
Figure 6:
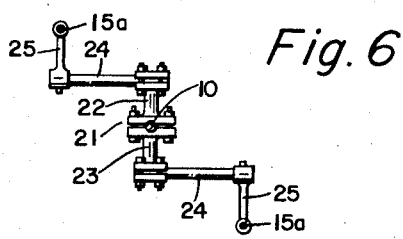
FIG. 6 is a cross-sectional view taken on line 6—6 of FIG. 5.

In FIG. 5, I have shown another embodiment of my invention which utilizes torsion bars in the vibration trap 12c. A connector 13 is fixed to the vibratory member 10 and the ends of a pair of rigid transfer elements, such as bars 15a, are secured to the connector, as at 16, in diametrically opposed relationship. A torsion bracket 21 is affixed to another portion of the member 10 in longitudinally-spaced relationship to the connector 13 to define the trap zone 11 therebetween.

The bracket 21 is provided with an upper post 22 and a lower post 23, diametrically opposite thereto, both of which lie in the axial plane of the member 10 which is defined by the connections 16. A torsion bar 24 is affixed to the upper post 22 and projects laterally therefrom in a direction normal to the plane of the posts 22 and 23. A like torsion bar 24 is similarly affixed to the lower post 23 but projects laterally in an opposite direction.

A lever arm 25 is affixed to the free end of each of the torsion bars 24 and extends outwardly in planes parallel to the plane of the posts 22 and 23. Means 26 are provided for securing an end of each transfer bar 15a to one of the lever arms 25.

The transfer bars 15a are tensioned by means of the adjustable securement 16 to impress a torsional stress upon the torsion bars 24 and to relieve the tension on the member 10 in the trap zone 11. The torsional pre-stressing of the bars 24 creates a physical condition comparable to that created by the elements 18 or 18a in FIGS. 2 and 4, respectively. This condition is one in which the torsional forces exert a mechanical restraint upon lateral displacement of a portion of the member 10 and thus physically suppress undulatory movement of the member 10 within the trap zone.

It will be noted that in this form of the invention, the transfer elements are not only angularly inclined to the axis of the member 10, but are also angularly inclined to the plane of the axis. This angular arrangement, with utilization of the torsional bracket 21, permits a single pair of transfer elements to be highly sensitive to omnidirectional vibration wave patterns and thus, in this form of invention, a lesser number of transfer elements can be used than would be neecssary for equally effective directional sensitivity in the other forms previously described.

In utilizing my invention on power transmission wires, a vibration trap 12, 12a, 12b or 12c would be secured to the member 10 at each end of the power line span, relatively close to the supporting towers which carry the electrical insulators. Thereby, the vibration traps will suppress damaging vibrations propogated in the member 10 at the points where the vibration waves are most often generated, or anywhere in the span, and will prevent such vibrations from being propogated and carried throughout the span or reflected back from the support points.

The vibrations vary considerably in frequency and wave-length in power transmission lines. Frequencies may range from very small values, such as 5 c.p.s., up to the audible range of about 700 c.p.s. Wavelengths may range from 10 feet to fractions of a foot. As aforementioned, each vibratory member will have a dominant natural frequency of vibration of a particular wavelength. In utilizing my invention, a trap zone should be established of a length equal to at least one-half the wavelength of the natural frequency of vibration of the vibratory member. Preferably, the trap zone should equal one wave length or a multiple thereof. Thus, in contradistinction to prior art vibration damping devices which attempt to establish a localized suppression point on power line member 10, my invention contemplates a relatively large trap zone which may be several feet in length, particularly when it is directed to the suppression of the low frequency vibration waves which can create the most severe damage to the member 10.

When the transfer elements are used in tension, they can be tightened or stretched to a stress value which relieves the tension on the vibratory member by as little as 10% or as much as 100%. When the transfer elements are used in compression they may impose additional tension stress of from 5% to over 100% on the vibratory member in the trap zone. The selection of the relationship between the stress values in the trap zone and the stress values in the transfer members can be determined empirically for optimum effectiveness in each particular application of vibration suppression, giving consideration to the composition and size of the member 10. It will be noted that the degree of tension or compression impressed upon the transfer elements can be varied or adjusted to attain such optimum effectiveness. Furthermore, under circumstances where some change occurs of permanent or semi-permanent duration such as a seasonal change in temperature or a permanent deformation of a support member, which influences a change in the vibration characteristics of the vibratory member, the adjustability of the device permits its characteristics to be changed to accommodate the changed physical circumstances.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention I claim:

1. A method of damping vibrations in the span of a vibratory member having a pair of spaced support terminals and having a dominant natural frequency and wave length of vibration, comprising the steps of mechanically forcing a change in the stress in a selected longitudinal portion of said member intermediate said support terminals to a value of different magnitude than the stress existant in said member externally of said portion, imposing a value of stress equivalent to said change on a plurality of separate elements integrated with said portion of said member, introducing a radial component of force between said elements and said portion to restrain said portion against relative radial displacement, and maintaining said portion and said elements free of direct restraint by either of said support terminals.

2. A method of damping vibrations in the span of a vibratory member having a pair of spaced support terminals and having a dominant natural frequency and wave length of vibration, comprising the steps of mechanically forcing a change in the stress in a selected longitudinal portion of said member intermediate said support terminals to a value of different magnitude than the stress existant in said member externally of said portion, maintaining said portion free of direct restraint by either of said support terminals, and imposing a radial force pattern upon said selected portion of said member to restrain said portion against radial displacement.

3. A method of damping vibrations in the span of a vibratory member having a pair of spaced support terminals and having a dominant natural frequency and wave length of vibration, comprising the steps of establishing a mechanically isolated zone portion on the span of said member intermediate said support terminals, said zone portion being established between two longitudinally spaced points defining a wave length-proportioned distance thereon, mechanically forcing a change in the stress in said zone to a value which is at least a 5% variation from the value of stress existant in said member external to said zone, impressing multi-directional radial components of force on said zone portion to restrain said portion against radial displacement, and maintaining said zone portion free from direct restraint by either of said support terminals.

4. A method of damping vibrations in the span of a longitudinal vibratory member as defined in claim 3, wherein said vibratory member is in a condition of tension and said change in stress increases the tension in said zone portion.

5. A method of damping vibrations in the span of a longitudinal vibratory member as defined in claim 3, wherein said vibratory member is in a condition of tension and said change in stress decreases the tension in said zone portion.

6. A method of damping vibrations in the span of a longitudinal vibratory member as defined in claim 3, wherein said zone portion has a length equivalent to at least ½ wave length of the natural frequency of vibration of said member.

7. In a vibration damping device for the span of a longitudinal vibratory member having a pair of spaced support terminals and having a dominant natural frequency and wave length of vibration, the combination of a pair of longitudinally spaced connectors secured on the span of said member intermediate said support terminals to define a trap zone between said connectors, stress transfer means secured between said connectors for mechanically forcing a change in the stress in said trap zone of said member to a value different than the stress in said member external to said zone, and means responsive to said stress transfer means for introducing a radial component of force on said member in said trap zone.

8. In a vibration damping device for the span of a longitudinal vibratory member having a pair of spaced support terminals and having a dominant natural frequency and wave length of vibration, the combination of a pair of longitudinally spaced connectors secured to said member intermediate said support terminals and defining a trap zone of wave length-proportioned length between said connectors, a plurality of stress-transfer elements secured between said connectors in circumferentially-spaced relationship around said member in a radial force-producing pattern relatively thereto, and means for adjusting the stress in said elements to modify the stress in said member within said trap zone.

9. A combination as defined in claim 8, in which said stress transfer elements are in tension.

10. A combination as defined in claim 8, in which said stress transfer elements are in compression.

11. A combination as defined in claim 8, including radially-extending projections carried by said member and engaging said stress-transfer elements to maintain said elements at an acute angle to the longitudinal axis of said member.

12. A combination as defined in claim 8, wherein said stress-transfer elements impose radial components of force upon said member to restrain said member against radial displacement within said trap zone relatively to its longitudinal axis.

13. In a vibration damping device for the span of a longitudinal vibratory member having a pair of spaced support terminals and having a dominant natural frequency and wave length of vibration, the combination of a pair of longitudinally spaced connectors secured to said member intermediate said support terminals, a pair of torsion bars secured to one of said connectors and projecting respectively to opposite sides of the longitudinal axis of said member, a pair of stress-transfer elements secured between said connectors in operative association with said torsion bars, and means associated with said elements for mechanically imposing a variable stress upon each of them and upon said torsion bars, whereby to accomplish a transfer of stress between said elements and that portion of said member disposed between said connectors.

References Cited in the file of this patent

UNITED STATES PATENTS

| | | |
|---|---|---|
| 470,382 | Kerstein | Mar. 8, 1892 |
| 1,319,374 | Cahen | Oct. 21, 1919 |
| 1,676,006 | Crook | July 3, 1928 |
| 1,965,494 | Goodrich | July 3, 1934 |
| 1,997,154 | Schmitt | Apr. 9, 1935 |
| 2,065,490 | Febrey | Dec. 22, 1936 |
| 2,136,238 | Engster | Nov. 8, 1938 |
| 2,374,823 | Leib et al. | May 1, 1945 |

FOREIGN PATENTS

| | | |
|---|---|---|
| 17,316 | Sweden | May 2, 1904 |
| 20,517 | Sweden | Sept. 7, 1904 |
| 258,167 | Italy | Apr. 7, 1928 |
| 338,304 | Great Britain | Nov. 20, 1930 |
| 466,024 | Great Britain | May 18, 1937 |